(12) United States Patent
Iwasaki

(10) Patent No.: US 8,302,759 B2
(45) Date of Patent: Nov. 6, 2012

(54) PRODUCT ACCUMULATION DEVICE

(75) Inventor: Yasuyuki Iwasaki, Fuchu-shi (JP)

(73) Assignee: Orion Machinery Co., Ltd., Tokyo (JP)

( * ) Notice: Subject to any disclaimer, the term of this patent is extended or adjusted under 35 U.S.C. 154(b) by 313 days.

(21) Appl. No.: 12/920,955

(22) PCT Filed: Mar. 12, 2009

(86) PCT No.: PCT/JP2009/054762
§ 371 (c)(1),
(2), (4) Date: Sep. 3, 2010

(87) PCT Pub. No.: WO2009/116449
PCT Pub. Date: Sep. 24, 2009

(65) Prior Publication Data
US 2011/0005901 A1 Jan. 13, 2011

(30) Foreign Application Priority Data

Mar. 18, 2008 (JP) ................................. 2008-069473

(51) Int. Cl.
*B65G 33/06* (2006.01)
*B65B 35/44* (2006.01)
*B65G 15/14* (2006.01)

(52) U.S. Cl. .................. 198/431; 198/457.04; 198/663; 53/154

(58) Field of Classification Search ............... 198/347.1, 198/418.3, 418.4, 419.3, 431, 457.04, 657, 198/663; 53/147, 154, 542
See application file for complete search history.

(56) References Cited

U.S. PATENT DOCUMENTS

| 3,693,777 A * | 9/1972 | Beauchemin | 198/459.4 |
| 4,768,642 A * | 9/1988 | Hunter | 198/419.2 |
| 5,887,701 A * | 3/1999 | Spatafora | 198/431 |
| 6,953,113 B2 * | 10/2005 | Iwasa et al. | 198/419.1 |
| 2001/0001997 A1 * | 5/2001 | Ghiotti et al. | 198/431 |

FOREIGN PATENT DOCUMENTS

| JP | B1-28-5921 | 11/1953 |
| JP | A-4-87929 | 3/1992 |
| JP | A-2006-225121 | 8/2006 |

OTHER PUBLICATIONS

Section 2 of the Written Opinion of the International Searching Authority dated Sep. 7, 2010 (with translation).
International Search Report dated Jun. 23, 2009 in corresponding International Application No. PCT/JP2009/054762 (with translation).

* cited by examiner

*Primary Examiner* — Mark A Deuble
(74) *Attorney, Agent, or Firm* — Oliff & Berridge, PLC

(57) ABSTRACT

To provide a product accumulation device with superior general-purpose capabilities, being able to cope with the modified specification of target products only by partially altering the structure thereof.

An accumulation means of a product accumulation device includes: a rotary member having a product contact surface relative to products supplied from the product supply means, and a guide member that is provided with the rotary member and that shifts the products from the product contact surface to an approximately perpendicular direction relative to the product contact surface by means of the rotation of the rotation member, thereby being able to cope with the modified specification of target products only by partially altering its structure.

15 Claims, 7 Drawing Sheets

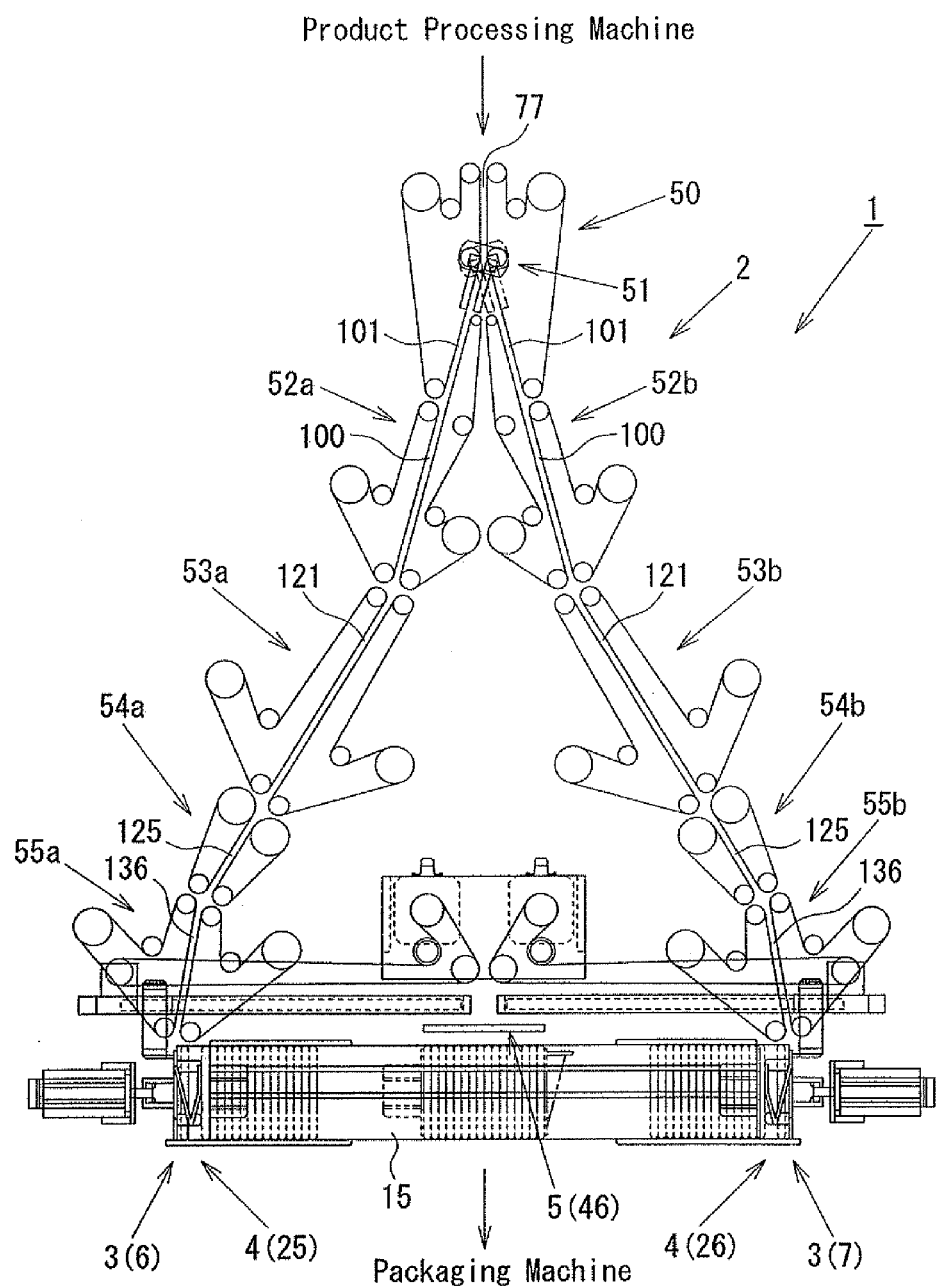
F I G. 1

F I G. 9
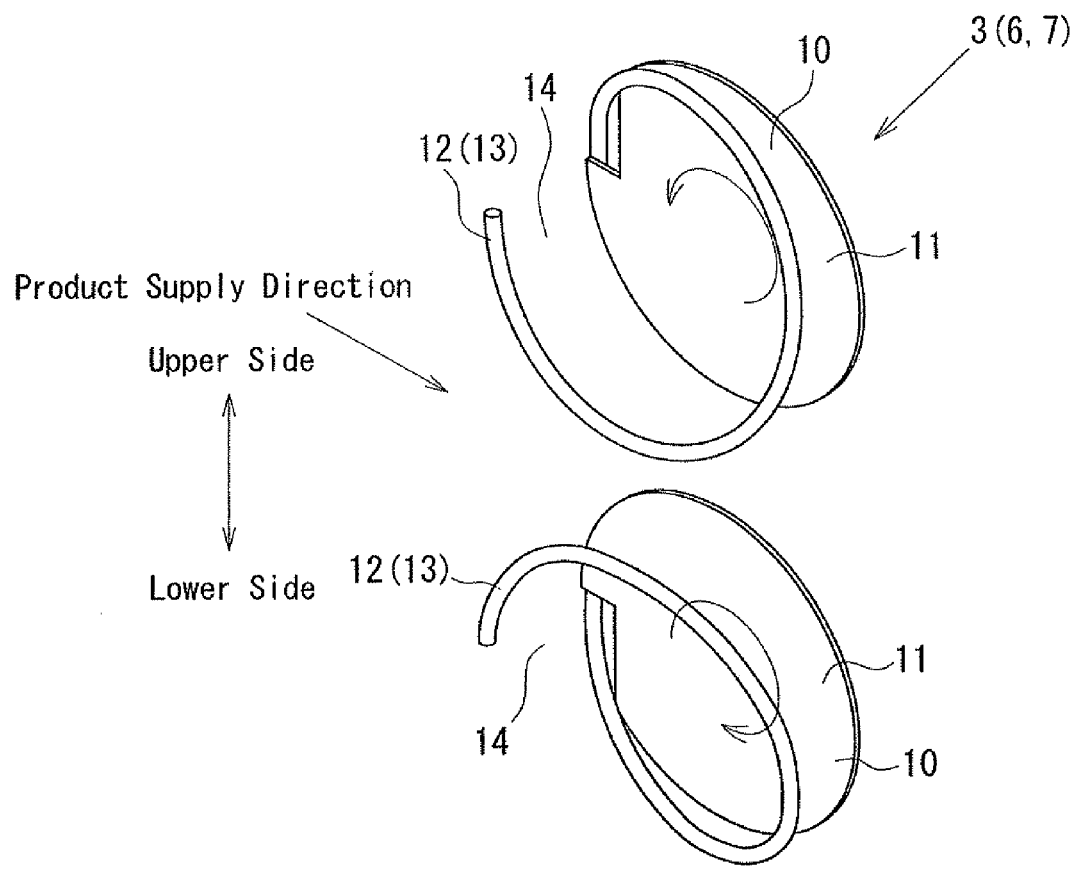

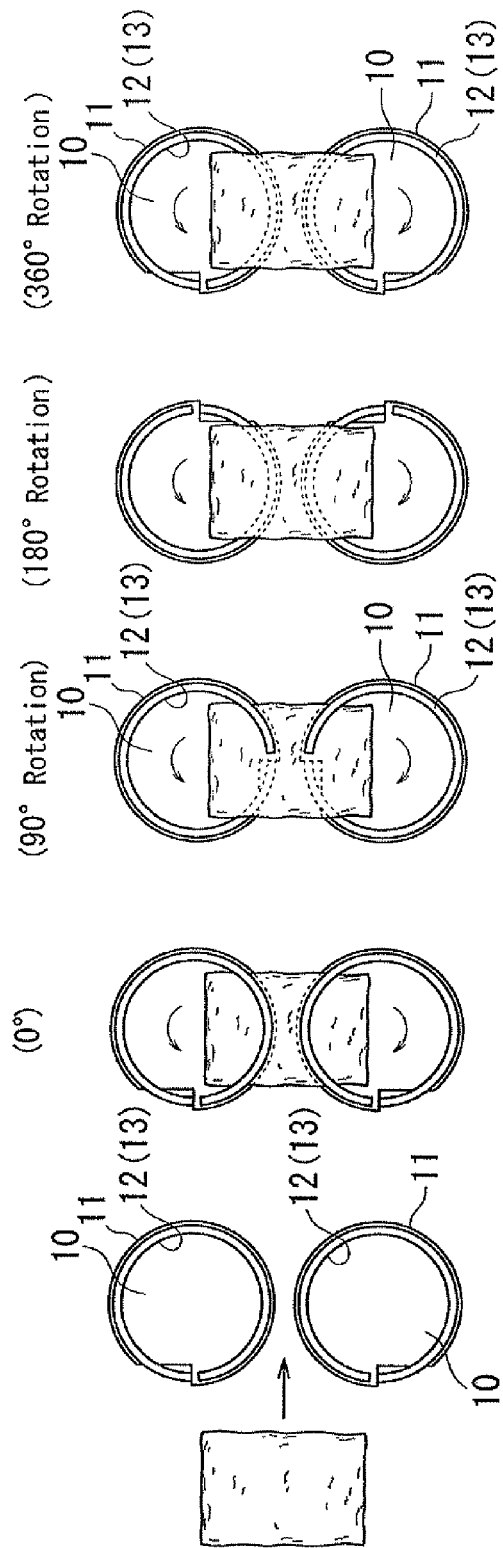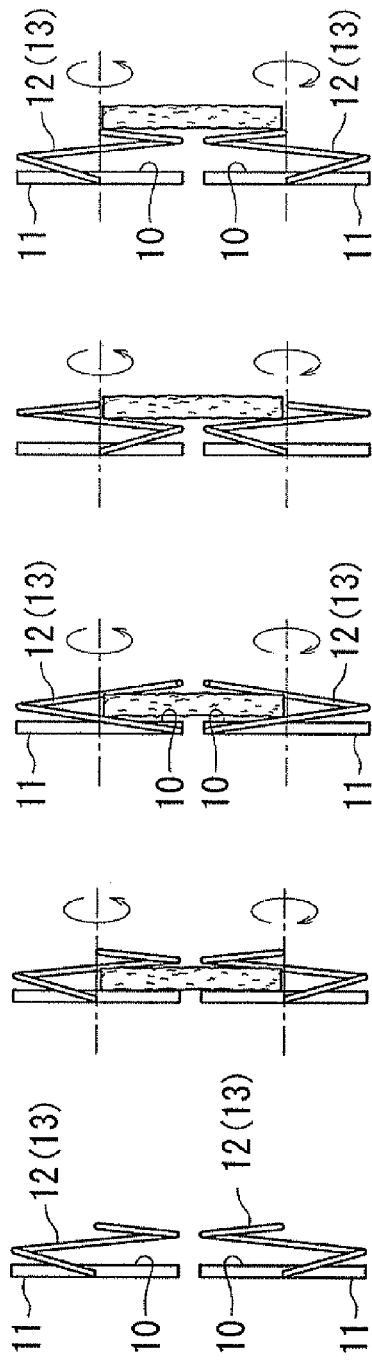
FIG. 10(a)   FIG. 10(b)   FIG. 10(c)   FIG. 10(d)   FIG. 10(e)

PRODUCT ACCUMULATION DEVICE

TECHNICAL FIELD

The present invention relates to a product accumulation device that accumulates every predetermined number of products sequentially supplied from a product supply means, and that exports the products to a next process.

BACKGROUND ART

In conventional product accumulation devices, a plurality of blade members are perpendicularly provided on the external periphery of an endless rotary conveyor at regular intervals so as to form a product container placed between the blade members adjacent to each other. While the rotary conveyor drives, the product container placed between the blade members adjacent to each other is adapted to face the product supply portion of a product supply means in sequence. Accordingly, each of the products is adapted to be housed one by one in each of the product container from the product supply means. At a stage where the predetermined numbers of products have been shifted to an export area, the products are exported for a next process (see Patent Document 1).

However, in these conventional product accumulation devices, the gap width of the blade members adjacent to each other cannot be accommodated to target products on all occasions. In case the gap width of the blade members adjacent to each other is attempted to modify according to the specification of the target products, it would become necessary to change the structure of the whole device, concluding that general-purpose capabilities are poor.

Patent Document 1: Japanese Patent Application Laid-open No. 2006-225121

DISCLOSURE OF THE INVENTION

Problem to be Solved by the Invention

As discussed, the conventional product accumulation devices are constructed as that the products are supplied between the blade members adjacent to each other, and accumulated every predetermined number. The gap width of the blade members adjacent to each other cannot be thus accommodated to target products on all occasions whereby general-purpose capabilities have been poor.

The present invention has been made in light of the above problem, and it is an object of the present invention to provide a product accumulation device with general-purpose capabilities where, even though the specification of target products is modified, it can be accommodated only by partial structure modifications.

Means to Solve the Above Problem

In the present invention, as a means to solve the above-described problems, the present invention according to claim 1 is featured as that a product accumulate device comprises an accumulation means that accumulates a product sequentially supplied from a product supply means, the product accumulate device being composed of: a rotary member having a product contact surface to the product supplied from the product supply means; and a guide member that is provided with the rotary member and shifts the product from the product contact surface to a direction approximately perpendicular to the product contact surface by rotation of the rotary member.

With this construction, while the products are sequentially supplied from the product supply means in such a manner as to contact to the product contact surface of the rotary member, the rotary member rotates in a sequential manner. Accordingly, the products are transported along the guide member, from the product contact surface of the rotary member to a direction approximately perpendicular to the product contact surface. The products are then accumulated.

In the invention recited in claim 2, according to the recitation of claim 1, the guide member is featured as having one end that is fixed to an external periphery end of the product contact surface of the rotary member, the guide member being constructed by a blade-shaped or a rod-shaped member that spirally extends from the one end to a direction approximately perpendicular to the product contact surface.

With this structure, the products are supplied to the maximum gap region between the product contact surface of the rotary member and the blade-shaped member or the rod-shaped member. Accordingly, the products contact to the product contact surface of the rotary member, and when the rotary member rotates in a direction opposite to a spiral rotating direction which directs from one end to the other end of either the blade-shaped member or the rod-shaped member, the products shift from the product contact surface to a direction approximately perpendicular relative to the product contact surface in such a manner as to be guided by either the blade-shaped or the rod-shaped member, both members being rotated.

In the invention recited in claim 3, according to the invention recited in claim 1 or claim 2, the rotary member is arranged in pairs so that the product extends over the product contact surface.

With this construction, the product contacts to the product contact surface of each of the rotary members in such a manner as to extend over the product contact surface. When each of the rotary members rotates, the product shifts from the product contact surface of each of the rotary members to a direction approximately perpendicular relative to the product contact surface in such a manner as to be guided by the guide member of each of the rotary members.

In the invention recited in claim 4, according to the invention recited in any one of claims 1 to 3, the product accumulation device is provided with a retaining means that retains every predetermined number of the products accumulated by the rotary member having the guide member.

With this construction, the predetermined numbers of products are transported while retained by the retaining means.

In the invention recited in claim 5, according to the invention recited in any one of claims 1 to 4, the product supply means is arranged as that a direction where the product is supplied from the product supply means crosses with an acute angle relative to the product contact surface of the rotary member.

With this construction, it is possible that the product supplied from the product supply means is received by the product contact surface of the rotary member.

Effects of the Invention

According to the first aspect of the present invention, when the products are sequentially supplied from the product supply means in such a manner as to contact to the product contact surface of the rotary member, the rotary member sequentially rotates whereby the products shift along the guide member, from the product contact surface of the rotary member to a direction approximately perpendicular relative to the product contact surface, the product being then accumulated. Accordingly, event if the contour of the target productions is modified, only the construction of the guide member should be changed, thereby enjoying superior general-purpose capabilities.

According to the second aspect of the present invention, since the guide member is constructed with the blade-shaped or rod-shaped member that extends spirally in a direction approximately perpendicular relative to the product contact surface of the rotary member, the construction can be simplified. Further, in case that the contour of the target products, specially their thickness, is modified, a necessary modification will be only to change the maximum gap width between the product contact surface of the rotary member and the blade-shaped or the rod-shaped member. Accordingly, the modification can be accomplished with easy procedure.

According to the third aspect of the present invention, it is possible to transport the products in a further stable condition, from the product contact surface of each of the rotary members to a direction that is approximately perpendicular relative to the product contact surface.

According to the fourth aspect of the present invention, by means of the retaining means, it is possible to transport the products every predetermined number, thereby making the transport of the products to a next process facilitated.

According to the fifth aspect of the present invention, it is possible that the products transported from the product supply means are received by the product contact surface of the rotary member, thereby making the accumulation of the products to be smoothed.

BRIEF DESCRIPTION OF THE DRAWINGS

FIG. 1 is a plan view of a product accumulation device according to the embodiment of the present invention;

FIG. 9 is the perspective view of each rotary member and a rod-shaped member of the accumulation means of the product accumulation device according to the embodiment of the present invention; and FIG. 10 is a step-by-step view where the products shift from each product contact surface to a direction approximately perpendicular relative to each product contact surface by means of each of the rotating spiral rod-shaped members.

DESCRIPTION OF THE REFERENCE NUMERALS

Figure 2:
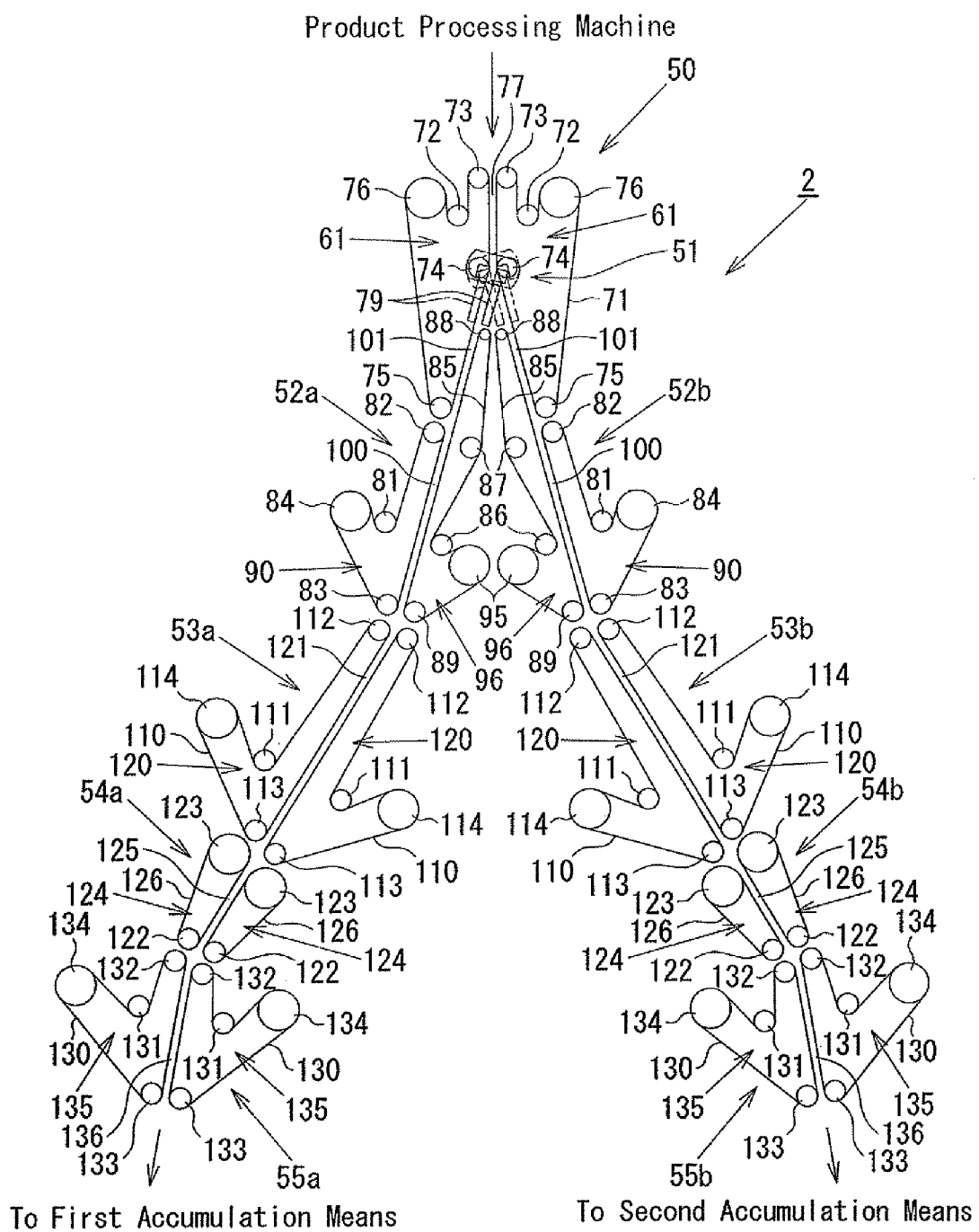
FIG. 2 is a plan view of a product supply means of the product accumulation device according to the embodiment of the present invention.

1 Product accumulation device
2 Product supply means
3 Accumulation means
4 Retaining means
5 Product export means
10 Product contact surface
11 Rotary member
12 Guide member
13 Rod-shaped member
28 Received-side plate
29 Pushed-side plate
46 Export pusher

BEST MODES FOR CARRYING OUT THE INVENTION

Hereinafter, the best modes for carrying out the present invention will be explained in detail with reference to FIGS. 1 to 10. In a product accumulation device 1 according to the embodiment of the present invention, as shown in FIG. 1, flat-shaped products such as a nappy that are transported from a product processing machine are accumulated every predetermined number and exported to a packaging machine. The product accumulation device 1 comprises: a product supply means 2 that transports the products sent from the product processing machine in order of reception; an accumulation means 3 that sequentially arranges and accumulates the product supplied from the product supply means 2; a retaining means 4 that retains every predetermined number of the products that have been accumulated at the accumulation means 3; and a product export means 5 that transports every predetermined number of the products that have been accumulated by the accumulation means 3 to the packaging machine.

As shown in FIGS. 1 and 2, the product supply means 2 is for transporting the products exported from the product processing machine so as to supply the products to the accumulation means 3. The product supply means 2 comprises: a first product supply means 50 that first receives the products exported from the product processing machine for transportation; a product distribution means 51 that distributes every predetermined number of the products transported from the first product supply means 50 into two lines; second product supply means 52a, 52b that each transport the predetermined numbers of products which have been distributed by the product distribution means 51; third product supply means 53a, 53b that each transport the products exported from the second product supply means 52a, 52b; fourth product supply means 54a, 54b that each transport the products exported from the third product supply means 53a, 53b; and fifth product supply means 55a, 55b that each transport the products exported from the fourth product supply means 54a, 54b so as to supply the products to first and second accumulation means 6, 7.

Here, since the second product supply means 52a, 52b, the third product supply means 53a, 53b, the fourth product supply means 54a, 54b, and the fifth product supply means 55a, 55b are constructed from a pair of identical members, these members are hereinafter explained by the second product supply means 52a, 52b, the third product supply means 53a, 53b, the fourth product supply means 54a, 54b, and the fifth product supply means 55a, 55b.

As shown in FIG. 2, in the first product supply means 50, a band unit 61 is arranged in pairs, the band unit 61 being constructed as that a plurality of guide rollers 72 to 75 and driving rollers 76 where an endless band 71 is arranged at a predetermined position are wound around. Further, an interval where the endless band 71 of each of the band units 61 faces to each other (the whole area between the guide roller 73 and the guide roller 74 of each of the band units 61) will be a transport passage 77 for the product.

The product distribution means 51 is arranged at a position where the guide rollers 74, 74 of each of the band units 61 of the first product supply means 50 are superimposed. The product distribution means 51 is constructed with a pair of guide plates 79, the tip openings of which are swingable. Due to swing of the tip openings of the pair of guide plates 79, it would be possible to distribute every predetermined number of the product that has been transported from the first product supply means 50 into the second product supply means 52a, 52b.

In the second product supply means 52a, 52b, a band unit 90 is arranged in pairs, the band unit 90 being constructed as that a plurality of guide rollers 81 to 83 and driving rollers 84 where an endless band 80 is arranged at a predetermined position are wound around. Further, a band unit 96 is also arranged in pairs, the band unit 96 being constructed as that a plurality of guide rollers 86 to 89 and driving rollers 95 where an endless band 85 is arranged at a predetermined position are wound around. Here, intervals where the endless bands 80 and 85 of each of the band units 90, 96 face to each other (the whole area between the guide roller 82 and the guide roller 83 on the side of the band unit 90/the area between the guide roller 88 and the guide roller 89, that is, from approximately intermediate region to a downstream side on the side of the band unit 96) will be a transport passage 100 for the product.

In addition to the above, an interval where the endless band 85 of the band unit 96 of the second product supply means 52a, 52b and the endless band 71 of the first product supply means 50 face to each other (an upstream region between the guide roller 88 and the guide roller 89 on the side of the band unit 96 of the second product supply means 52a, 52b/the area between the guide roller 74 and the guide roller 75, that is, from an approximately intermediate region to a downstream side on the side of the band unit 61 of the first product supply means 50) will be also a transport passage 101 for the product.

In the third product supply means 53a, 53b, a band unit 120 is arranged in pairs, the band unit 120 being constructed as that a plurality of guide rollers 111 to 113 and driving rollers 114 where an endless band 110 is arranged at a predetermined position are wound around. Further, an interval where the endless band 110 of each of the band units 120 faces to each other (the whole area between the guide roller 112 and the guide roller 113 of each of the band units 120) will be a transport passage 121 for the product.

In the fourth product supply means 54a, 54b, a band unit 124 is arranged in pairs, the band unit 124 being constructed as that a guide roller 122 and a driving roller 123 where an endless band 126 is arranged at a predetermined position are wound around. Further, an interval where the endless band 126 of each of the band units 124 faces to each other will be a transport passage 125 for the product.

In the fifth product supply means 55a, 55b, a band unit 135 is arranged in pairs, the band unit 135 being constructed as that a plurality of guide rollers 131 to 133 and driving rollers 134 where an endless band 130 is arranged at a predetermined position are wound around. Further, an interval where the endless band 130 of each of the band units 135 faces to each other (the whole area between the guide roller 132 and the guide roller 133 of each of the band units 135) will be a transport passage 136 for the product.

Figure 3:
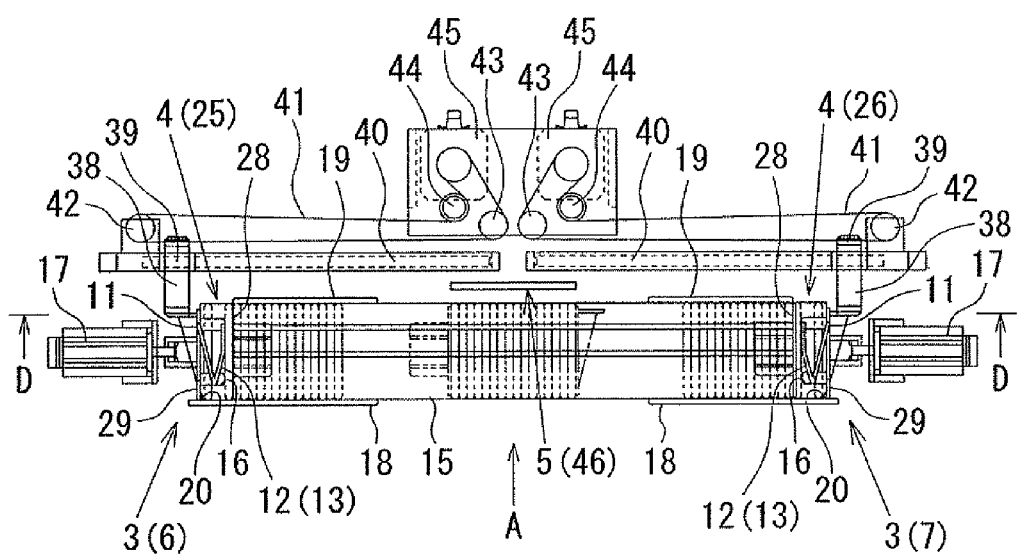
FIG. 3 is a plan view of an accumulation means, a retaining means and a product transport means of the product accumulation device according to the embodiment of the present invention.

As shown in FIGS. 1 and 3, the accumulation means 3 comprises: the first accumulation means 6 that is arranged at a position facing the export port of the transport passage 136 of the fifth product supply means 55a of the product supply means 2; and the second accumulation means 7 that is arranged at a position facing the export port of the transport passage 136 of the fifth product supply means 55b. The first and second accumulation means 6, 7 are both constructed as the same, and, as shown in FIGS. 1, 3 and 9, comprise: a rotary member 11 that has a product contact surface 10 relative to the product supplied either from the fifth product supply means 55a or 55b; and a guide member 12 that is provided with the rotary member 11 and transports the products from the product contact surface 10 to a direction approximately perpendicular to the product contact surface 10 by the rotation of the rotary member 11.

As shown in FIGS. 3 and 9, the rotary member 11 is formed into a circular plate and is connected with a servo-motor for rotary member 17 on a surface opposite to the product contact surface 10. The guide member 12 is, as clearly seen from FIG. 9, composed of a rod-shaped member 13. One end of the rod-shaped member 13 is fixed to any arbitrary place on the external circumferential end of the rotary member 11, and spirally extends and approximately makes one round in a direction approximately perpendicular relative to the product contact surface 10 (one end and the other end of the rod-shaped member 13 are approximately superimposed to each other in a direction perpendicular relative to the product contact surface 10). Here, the maximum gap region 14 between the product contact surface 10 of the rotary member 11 and the other end of the rod-shaped member 13 is set to be larger than the thickness of target products.

Figure 4:
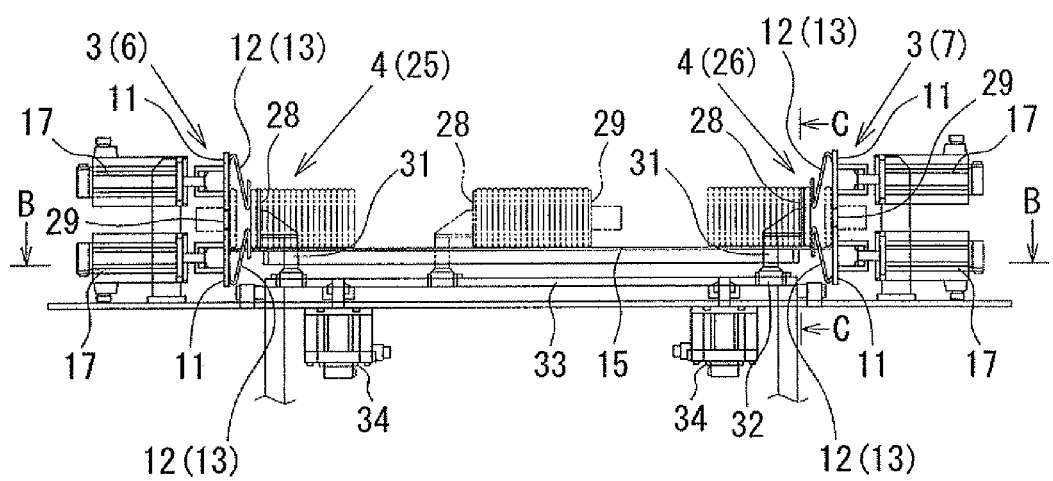
FIG. 4 is a view on arrow A of FIG. 3.

To be further specific, as shown in FIGS. 4 and 9, the rotary member 11 is vertically arranged in pairs in such a manner that the product extends over the product contact surface 10. The rotary member 11 placed of the upper side is provided with the rod-shaped member 13 spirally extending in a clockwise direction which directs from one end to the other end of the rod-shaped member 13. In the upper-side rotary member 11, the maximum gap region 14 between the product contact surface 10 and the other end of the rod-shaped member 13 that is fixed to the rotary member 11 and spirally extends in a clockwise direction is arranged so as to direct the export port of the fifth product supply means 55a or 55b.

On the other hand, the rotary member 11 of the lower side is provided with the rod-shaped member 13 spirally extending from one end to the other end of the rod-shaped member 13 in an anticlockwise direction. In the lower-side rotary member 11, the maximum gap region 14 placed between the product contact surface 10 and the other end of the rod-shaped member 13 that is fixed to the rotary member 11 and spirally extends in an anticlockwise direction is arranged so as to direct to the export port of the fifth product supply means 55a, 55b.

Each rotary member 11 of the first accumulation means 6 and each rotary member 11 of the second accumulation means 7 are arranged so that each product contact surface 10 faces to each other. Here, although explained later, between each rotary member 11 of the first accumulation means 6 and each rotary member 11 of the second accumulation means 7, a table 15 that is rectangular in a planar view is arranged. Further, as shown in FIG. 1, the fifth product supply means 55a is arranged as that a direction where the product is supplied crosses at an acute angle relative to the product contact surface 10 of each rotary member 11 of the first accumulation means 6. Similarly, the fifth product supply means 55b is arranged as that a direction where the product is supplied crosses at an acute angle relative to the product contact surface 10 of each rotary member 11 of the second accumulation means 7. In addition, the arrangement of the fifth product supply means 55a, 55b is made as that the direction where the product is supplied relative to the product contact surface 10 of each rotary member 11 of the first and the second accumulation means 6, 7 can be optionally modified.

Further, as shown in FIG. 1, the table 15 that is rectangular in a planar view is arranged between each rotary member 11 of the first accumulation means 6 and each rotary member 11 of the second accumulation means 7. The table 15 places thereon each of the products that are arranged and accumulated by means of the first accumulation means 6 and the second accumulation means 7. This table 15 is, as shown in FIG. 4, arranged as that the upper surface thereof reaches to approximately the intermediate portion of the lower-side rotary member 11 in a vertical direction. The longitudinal length of the table 15 is set to approximately the same length between each rotary member 11 of the first accumulation means 6 and each rotary member 11 of the second accumulation means 7. Further, on the upper surface of the table 15 and at the end portions of both the first accumulation means 6 side and the second accumulation means 7 side, a cutout 16 is provided so as to avoid the interference of the spiral rod-shaped member 13 provided on the product contact surface 10 of the lower-side rotary member 11.

Figure 8:
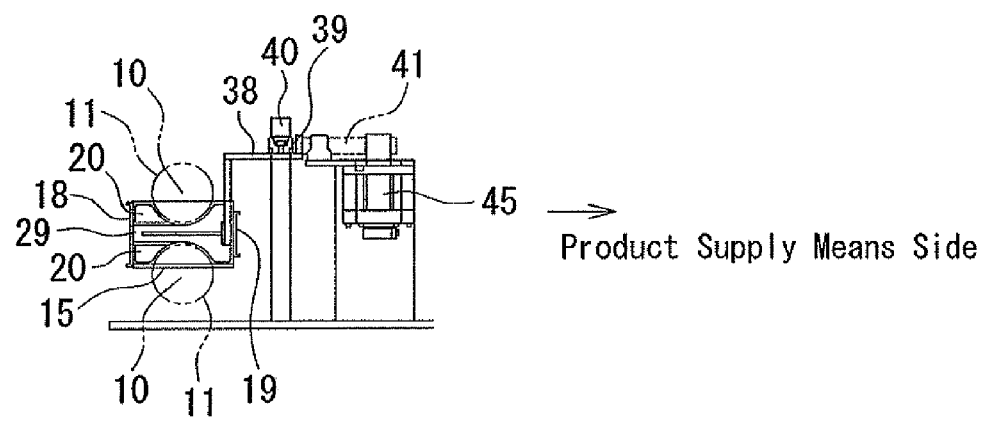
FIG. 8 is a view on arrow F of FIG. 7.

Still further, as shown in FIG. 3, on the table 15, platy product guides 18, 19 in a predetermined length are vertically provided at both ends of the portion adjacent to the first and the second accumulation means 6, 7. Between the product guides 18, 19, the product guide 18 placed on one side that is opposite side relative to the side of the product supply means 2 extends to a position in which to cross vertically arranged the pair of rotary members 11 provided on the first and the second accumulation members 6, 7. Moreover, as shown in FIGS. 3 and 8, between each of the product guides 18 and 19, at the end portions of the product guide 18 that is positioned opposite to the product supply means 2 and that is on the side of the first and the second accumulation means 6, 7, vertically arranged a pair of guide plate portions 20 is provided so as to orthogonally cross the product guide 18, the guide plate portions 20 being provided with space in such a manner as to vertically pinch a portion on the tip side of a pushed-side plate 29 later explained. The portion of each of the guide plate portions 20 on the side of each rotary member 11 of the first and the second accumulation means 6, 7 is cutout to be approximately an arc configuration in order not to interfere with the product contact surface 10 of each rotary member 11. Each of the guide plate portions 20 is then positioned to be approximately coplanar with the product contact surface 10 of each of the rotary member 11.

The retaining means, as shown in FIGS. 1 and 3, comprises: a first retaining means 25 corresponding to the first accumulation means 6; and a second retaining means 26 corresponding to the second accumulation means 7. The first and the second retaining means 25, 26 are constructed as the same, and are each directed in the same direction with the product contact surface 10 of each rotary member 11 of the first and the second accumulation means 6, 7. Further, the first and the second retaining means 25, 26 are composed of a received-side plate 28 and a pushed-side plate 29 that shift on the table 15. The received-side plate 28 and the pushed-side plate 29 each shift along the upper surface of the table 15 in its longitudinal direction. Further, the received-side plate 28 and the pushed-side plate 29 are adapted to shift on the table 15 in such a manner as to sandwich the predetermined numbers of products therebetween.

To be more specific, as shown in FIGS. 3 to 6, the received-side plate 28 is formed into a rectangular configuration. The received-side plate 28 is connected to a slide unit for received-side plate 32 through each connecting plate 31, 31 penetrating through the table 15. The slide unit for received-side plate 32 engages with a track rail for received-side plate 33 that linearly extends on the lower side of the table 15 in the longitudinal direction of the table 15. Further, the slide unit for received-side plate 32 is engaged with a timing belt for received-side plate 36. The timing belt for received-side plate 36 is wound around a guide roller 37 and the driving shaft of a servo-motor for received-side plate 34 that is arranged on the lower side of the table 15.

Figure 5:
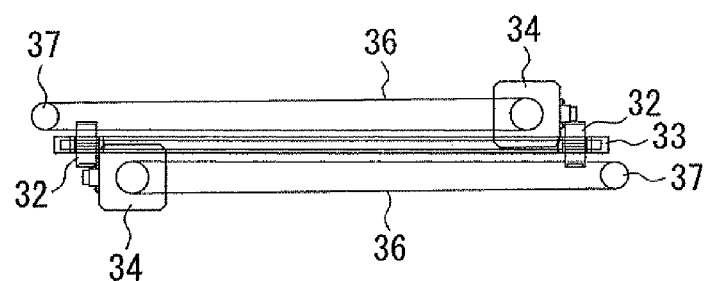
FIG. 5 is a view on arrow B of FIG. 4.
Figure 6:
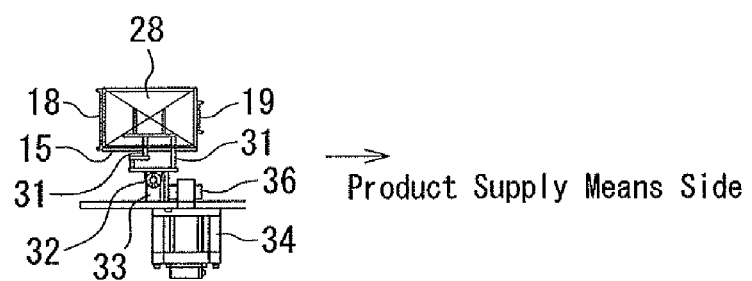
FIG. 6 is a view on arrow C of FIG. 4.

In addition, as shown in FIG. 5, the driving shaft of the servo-motor for received-side plate 34 that is placed on the upper side (the side of the product supply means 2) as well as the timing belt for received-side plate 36 that is wound around the guide roller 37 are connected to the received-side plate 28 corresponding to the first retaining means 25 (see FIG. 4) through the slide unit for received-side plate 32. Further, as shown in FIG. 5, the driving shaft of the servo-motor for received-side plate 34 placed on the lower side (the side opposite to the product supply means 2) and the timing belt for received-side plate 36 that is wound around the guide roller 37 are connected with the received-side plate 28 corresponding to the retaining means 26 (see FIG. 4) through the slide unit for received-side plate 32.

Accordingly, each of the received-side plate 28 of the first and the second retaining means 25, 26 will be shiftable on the table 15 along its longitudinal direction by means of the drive of each of the servo-motor for received-side plate 34. Here, each of the received-side plates 28 is arranged to shift on the side opposite to the first and the second accumulation means 6, 7 relative to each of the pushed-side plates 29. Further, at an initial state, each of the received-side plates 28 is arranged at a position adjacent to the other end of the rod-shaped member 13 provided with the pair of rotary members 11 (see FIG. 4).

Figure 7:
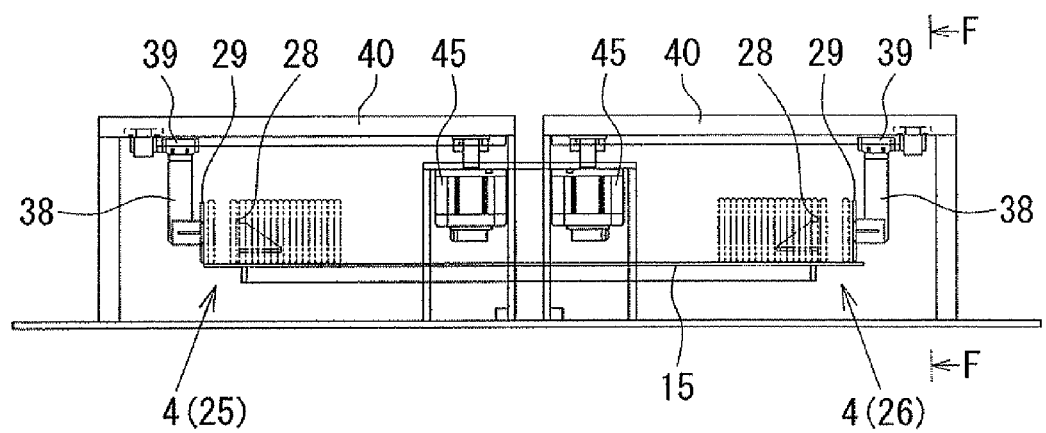
FIG. 7 is a view on arrow D of FIG. 3.

On the other hand, as shown in FIGS. 3, 7 and 8, the pushed-side plate 29 has one end portion that is connected with the slide unit for pushed-side plate 39 through a L-shaped connecting plate 38 extending along the lateral side of the table 15 (on the side of the product supply means 2). The slide unit for pushed-side plate 39 is adapted to engage with a track rail for pushed-side plate 40 that places on the lateral side of the table 15 (on the side of the product supply means 2) and that linearly extends at an area above the table 15 and in the same direction with the longitudinal direction of the table 15. Further, the slide unit for pushed-side plate 39 engages with a timing belt for pushed-side plate 41. The timing belt for pushed-side plate 41 is wound around a plurality of guide rollers 42 to 44 as well as the driving shaft of a servo-motor for pushed-side plate 45 that is arranged on the lateral side (on the side of the product supply means 2) of approximately intermediate of the table 15 in its longitudinal direction.

Further, as shown in FIG. 8, the pushed-side plate 29 has a tip side that is formed into a long strip configuration so as to close up between the pair of rotary members 11 vertically arranged. Still further, the side of the slide unit for pushed-side plate 39 is formed to be gradually widened so as to go along the outer periphery of the pair of the rotary members 11. Moreover, the widened end-portion of the pushed-side plate 29 is connected with the slide unit for pushed-side plate 39 through the connecting plate 38 that extends along the lateral side of the table 15. In addition, as shown in FIG. 8, the guide plate portions 20 provided at the end portion of the product guide 18 of the table 15 are adapted to arrange vertically on the tip side of the pushed-side plate 28.

Accordingly, each of the pushed-side plates 29 of the first and the second retaining means 25, 26 becomes shiftable on the table 15 in its longitudinal direction by means of the drive of each of the servo-motor for pushed-side plate 45. Here, each of the pushed-side plates 29 is arranged so as to shift on the side of the first and the second accumulation means 6, 7 compared to each of the received-side plates 28. Moreover, at an initial state, each of the pushed-side plate 29 is arranged so as to be approximately coplanar with the product contact surface 10 of the pair of rotary members 11.

In addition, the product accumulation device 1 is provided with a product detection means (not shown) such as a lightsensitive tube at proper portions thereof. In the present embodiment, the product detection means is each provided on the upstream side of each transport passage 101 at which the tip opening of the pair of guide plates 79 of the product distribution means 51 is positioned. Further, this product detection means and a servo-motor for guide plate (not shown) that swings the pair of guide plates 79 are electrically connected with each other. When transportation for predetermined numbers of the products is detected by means of the product detection means, the swinging direction of the pair of guide plates 79 is switched over.

Still further, the product detection means is each provided also at a place adjacent to the export port of the transport passage 136 of the fifth product supply means 55a, 55b. This product detection means, each of the servo-motor for rotary members 17 of the first and the second accumulation means 6, 7, each of the servo-motor for received-side plates 34 and each of the servo-motor for pushed-side plates 45 are each electrically connected with each other. By means of the detection of the products through the product detection means, performance for each of the rotary members 11, each of the received-side plates 28 and each of the pushed-side plates 29 are controlled.

As shown in FIGS. 1 and 3, the product export means 5 includes a plate export pusher 46 placed on the lateral surface of the table 15 (on the side of the product supply means 2) and at approximately intermediate of the table 15 in its longitudinal direction, the export pusher 46 extending in the same direction with the longitudinal direction of the table 15. The product export means 5 further includes a driving source (not shown) that shifts the export pusher 46 in such a manner as to intersect the upper side of the approximately intermediate of the table 15 in a longitudinal direction. The export pusher 46 is formed to be correspondent with the length of the whole thickness of the product accumulated with predetermined numbers.

Next, explanation will be focused on the function of the product accumulation device 1 according to the embodiments of the present invention. Here, at the initial state of the product accumulation device 1, each of the received-side plates 28 of the first and the second retaining means 25, 26 is arranged at a position adjacent to the other end of the rod-shaped member 13 provided with each of the rotary members 11 of the first and the second accumulation means 6, 7. Further, each of the pushed-side plates 29 of the first and the second retaining means 25, 26 is arranged so as to be approximately coplanar with the product contact surface 10 of each of the rotary members 11 of the first and the second accumulation means 6, 7.

To begin with, products are sequentially introduced from the product processing machine to the transport passage 77 of the first product supply means 50, the products being introduced in a longitudinal direction. Next, every predetermined number of the products is sequentially and alternately supplied from the transport passage 77 of the first product supply means 50 to the second product supply means 52a, 52b by means of the pair of guide plates 79. Here, by means of the product detection means provided with each of the transport passages 101 where the top opening of the pair of guide plates 79 is positioned, when the number of the products that have been detected reaches to a predetermined number, a signal is transmitted to the driving source of the pair of guide plates 79. The tip opening of the pair of guide plates 79 is swung so that the predetermined numbers of the products are alternately supplied to the second product supply means 52a, 52b.

Next, the predetermined numbers of products that have been supplied from the transport passage 77 of the first product supply means 50 to the second product supply means 52a by means of the pair of guide plates 79 are sequentially transported along the transport passage 101, the transport passage 100 of the second product supply means 52a, the transport passage 121 of the third product supply means 53a, the transport passage 125 of the fourth product supply means 54a, and the transport passage 136 of the fifth product supply means 55a. Then, the products are sequentially supplied from the export port of the transport passage 136 of the fifth product supply means 55a to the maximum gap region 14 placed between the product contact surface 10 of each of the rotary members 11 of the first accumulation means 6 and the end side of each of the rod-shaped members 13 by passing through the product detection means. Accordingly, as shown in FIG. 10(b); the products are placed on the upper surface of the table 15, and one side surface of the product contacts in such a manner as to extend over the product contact surface 10 of each of the rotary members 11.

Here, since the fifth product supply means 55a is arranged as that its product supply direction acutely crosses with the product contact surface 10 of each of the rotary members 11 of the first accumulation means 6, the products that have been rapidly supplied from the export port of the transport passage 136 of the fifth product supply means 55a to the maximum gap region 14 placed between the product contact surface 10 of each of the rotary members 11 of the first accumulation device 6 and the other end of each of the rod-shaped members 13 are first received by the product contact surface 10 of each of the rotary members 11. The products then interposes into the guide plate portion 20 provided at the end portion of the product guide 18 of the table 15, and are placed on the upper surface of the table 15 in a longitudinal direction. In addition, one side surface of the products is arranged in such a manner as to extend over the product contact surface 10 of each of the rotary members 11.

In the above condition, when the product detection means detects the products, a signal transmits to each of the servo-motor for rotary members 17 of the first accumulation means 6, the servo-motor for received-side plate 34 of the first retaining means 25, and the servo-motor for pushed-side plate 45. Further, a number of the transmissions from the product detection means will each count at the control board of the servo-motor for received-side plate 34 and the servo-motor for pushed-side plate 45. In addition, as shown in FIGS. 10(b) to 10(e), the vertically arranged pair of rotary members 11 that is the composition of the first accumulation means 6 will rotate in reciprocal directions by means of the driving of each of the servo-motor for rotary members 17. That is, the rotary member 11 placed on the upper side will rotate in an anti-clockwise direction (opposite to a spiral rotation direction that directs from one end to the other end of the rod-shaped member 13). On the other hand, the rotary member 11 placed on the lower side will rotate in a clockwise direction (opposite to a spiral rotation direction that directs from one end to the other end of the rod-shaped member 13).

With the above construction, as shown in FIGS. 10(b) to 10(e), the products that have been in contact with the product contact surface 10 of each of the rotary members 11 in such a manner as to extend over the product contact surface 10 will shift toward the received-side plate 28, in a direction from each of the product contact surfaces 10 to a direction approximately perpendicular relative to each of the product contact surfaces 10, as to be guided by each of the rotated spiral rod-shaped members 13. Here, each of the servo-motors for rotary member 17 is set up so as to drive at timing where the products contact to the product contact surface 10 of each of the rotary members 11 as to extend over the product contact surface 10 after the products pass through the product detection means and according to the signal from the product detection means.

At the same time, the received-side plate 28 that is the composition of the first retaining means 25 is adapted to shift on the table 15 for a predetermined distance (a distance corresponding to the thickness of the products) in a direction moving away relative to the product contact surface 10 of the rotary member 11 so as to receive the products transporting from the each of the rotary members 11.

Next, while the products are sequentially supplied from the export port of the transport passage 136 of the fifth product supply means 55a to the maximum gap region 14 placed between the product contact surface 10 of each of the rotary members 11 of the first accumulation means 6 and the other end of each of the rod-shaped members 13, the above operation will be repeated. Accordingly, the products are sequentially received by the received-side plate 28 and are arranged and accumulated by predetermined numbers.

Then, when the last predetermined numbers of the products are exported from the export port of the transport passage 136 of the fifth product supply means 55a, and the product detection means detects the last products, a signal is transmitted to the servo-motor for received-side plate 34 and the servo-motor for pushed-side plate 45. Here, as discussed hereinabove, each of the rotary members 11 first rotates, and the last products shift from each of the product contact surfaces 10 to the received-side plate 28 in such a manner as to be guided by each of the rotated spiral rod-shaped members 13. The received-side plate 28 will then receive the last products.

Subsequently, the pushed-side plate 29 that is the composition of the first retaining means 25 will shift on the table 15 in a direction coming toward the pushed-side plate 28 by means of the drive of the servo-motor for pushed-side plate 45 whereby the pushed-side plate 29 contacts to the last products. Then, the predetermined numbers of the products are sandwiched by the received-side plate 28 and the pushed-side plate 29 and are transported on the table 15 to its approximately intermediate position in the longitudinal direction. Here, the predetermined numbers of the products that are exported from the fifth product supply means 55a have been precedently inputted to the control board of the servo-motor for received-side plate 34 and the servo-motor for pushed-side plate 45. Accordingly, when each of the control boards detects that the products are the last ones according to a number of transmissions from the product detection means, each of the control boards will determine the driving types of the servo-motor for received-side plate 34 and the servo-motor for pushed-side plate 45 that correspond to the last products.

Next, the export pusher 46 shifts so as to pass over from the side of the product supply means 2 to the upper side of the table 15. The export pusher 46 then pushes out the products that have been accumulated by the predetermined numbers from the table 15 whereby the products are transported to the packaging machine. The received-side plate 28 and the pushed-side plate 29 of the first retaining means 25 are then returned to an initial state.

Further, the products that have been supplied from the transport passage 77 of the first product supply means 50 to the second product supply means 52b by means of the pair of guide plates 79 are sequentially transported along the transport passage 101, the transport passage 100 of the second product supply means 52b, the transport passage 121 of the third product supply means 53b, the transport passage 125 of the fourth product supply means 54b, and the transport passage 136 of the fifth product supply means 55b. Continuously, the products are sequentially supplied to the maximum gap region 14 placed between the product contact surface 10 of each of the rotary members 11 of the second accumulation means 7 and each of the rod-shaped members 13 by passing through from the export port of the transport passage 136 of the fifth product supply means to the product detection means. The products are then placed over the upper surface of the table 15 and contacts to the product contact surface 10 of each of the rotary members 11 in a condition of extending over the product contact surface 10.

The operations of the second accumulation means 7, the second retaining means 26 and the export pusher 46 that will be subsequently performed are identical with the first accumulation means 6, the first retaining means 25 and the export pusher 46. Accordingly, the explanation thereof will be omitted.

As discussed, the predetermined numbers of the products that have been supplied from the product processing machine to the second product supply means 52a by passing through the transport passage 77 of the first product supply means 50 by means of the pair of guide plates 79 are transported to the approximately intermediate portion of the table 15 in its longitudinal direction by means of the first accumulation means 6 and the first retaining means 25. Here, the predetermined numbers of products have been kept in an accumulated condition. The products are then transported to the packaging machine by means of the product export means 5. On the other hand, the predetermined numbers of the products that have been supplied from the product processing machine to the second product supply means 52b by passing through the transport passage 77 of the first product supply means 50 by means of the pair of guide plates 79 are transported to the approximately intermediate portion of the table 15 in its longitudinal direction by means of the second accumulation means 7 and the second retaining means 26. The predetermined numbers of products have been kept in an accumulated condition. The products are then transported to the packaging machine by means of the product export means 5. The above operations will be repeated.

As discussed hereinabove, in the product accumulation device 1 according to the embodiments of the present invention, the accumulation means 3 comprises: the rotary member 11 having the product contact surface 10 relative to the products supplied from the product supply means 2; and the rod-shaped member 13 where one end thereof is fixed to the external periphery of the product contact surface 10 of each of the rotary members 11, the rod-shaped member 13 spirally extending to approximately one round from one end of the rod-shaped member 13 to a direction approximately perpendicular relative to the product contact surface 10. Further, the rotary member 11 is vertically arranged in pairs as that the products extend over the product contact surface 10. The maximum gap regions 14 placed between the product contact surface 10 of the upper side rotary member 11 and the other end of the rod-shaped member 13 spirally extending from one end fixed to the rotary member 11 to a clockwise direction is arranged so as to direct the side where the products are supplied. The maximum gap region 14 placed between the product contact surface 10 of the lower-side rotary member 11 and the other end of the rod-shaped member 13 spirally extending from one end connected to the rotary member 11 to an anticlockwise direction is arranged so as to direct the side where the products are supplied.

Accordingly, the products are sequentially supplied from the fifth product supply means 55a, 55b to the maximum gap region 14 placed between the product contact surface 10 of each of the rotary members 11 of the accumulation means 3 and each of the rod-shaped members 13. The products are then placed over the upper surface of the table 15 and contacts to the product contact surface 10 of each of the rotary member 11 in such a manner as to extend over the product contact surface 10. Subsequently, each of the rotary members 11 rotates in a direction opposite to the spiral rotation direction that directs from one end to the other end of the rod-shaped member 13. That is, the upper-side rotary member 11 rotates in an anticlockwise direction while the lower-side rotation member 11 rotates in a clockwise direction. Accordingly, the products contacting the product contact surface 10 of each of the rotary members 11 in such a manner as to extend over the product contact surface 10 shift from each of the product contact surface 10 to the received-side plate 28 as to be guided by each of the rotated spiral rod-shaped members 11. The products are then arranged and accumulated by sequentially received by the received-side plate 28.

Further, the product accumulation device 1 according to the embodiments of the present invention is provided with the received-side plate 28 and the pressed-side plate 29 as the retaining means 4 in which to retain and transport every predetermined number of the products that have been accumulated by the accumulation means 3. Accordingly, it would be possible to smoothly export every predetermined number of the products toward the packaging machine at the next process. Here, in the product accumulation device 1 according to the embodiments of the present invention, since the above-explained operational effects can be enjoyed, even if target products are modified, it would be sufficient by determining the width, etc. of the maximum gap region 14 placed between the product contact surface 10 of each of the rotary members 11 and the other end of each of the rod-shaped members 13 according to the thickness of the target products. Thus, the product accumulation device 1 will enjoy superior general-purpose properties.

Here, in the product accumulation device 1 according to the embodiments of the present invention, the guide member 12 is configured by the spirally-extended, rod-shaped member 13; however, the guide member 12 may apply with the spirally-extended, blade-shaped member. Further, in the product accumulation device 1 according to the embodiments of the present invention, the product supply means 2 is composed of: the first product supply means 50, the second product supply means 52a, 52b, the third product supply means 53a, 53b, the fourth product supply means 54a, 54b, and the fifth product supply means 55a, 55b. However, the product supply means 2 may be fabricated by only the first product supply means 50 and the second product supply means 52a, 52b. There is no limitation to the configuration of the product supply means 2.

Further, in the product accumulation device 1 according to the embodiments of the present invention, the rotary member 11 is vertically arranged in pairs; however, the rotary member 11 does not need to be pairs. Only a single rotary member 11 would be sufficient.

Still further, in the product accumulation device 1 according to the embodiments of the present invention, the products that have been supplied from the product supply means 2 are accumulated and retained by means of the accumulation means 3 and the retaining means 4, and then exported to the packaging machine. However, the products that have been supplied from either the fifth product supply means 55a or 55b of the product supply means 2 may be sequentially arranged and accumulated in one direction by means of the accumulation means 3.

The invention claimed is:

1. A product accumulate device comprising an accumulation means that accumulates a product sequentially supplied from a product supply means, wherein:
   the accumulation means is composed of: a rotary member having a product contact surface relative to the product supplied from the product supply means; and a guide member that is provided with the rotary member and shifts the product from the product contact surface to a direction perpendicular to the product contact surface by rotation of the rotary member,
   the guide member has one end that is fixed to an external periphery end of the product contact surface of the rotary member, the guide member being constructed by a blade-shaped or a rod-shaped member that spirally extends from the one end to a direction perpendicular to the product contact surface,
   the rotary member is arranged in pairs so that the product extends over the product contact surface,
   a retaining means is provided so as to retain every predetermined number of the product accumulated by the accumulation means, and
   the retaining means is composed of a received-side plate and a pushed-side plate where the accumulated product is pinched therebetween, and the pushed-side plate is arranged between the pairs of rotary members.

2. The product accumulation device according to claim 1, wherein the accumulation means is arranged at two portions of the product accumulation device as to face to each other sandwiching a table on which each product arranged and accumulated is placed, and the product that is supplied from the product supply means is alternately accumulatable on the table in every predetermined number by means of each of the accumulation means.

3. The product accumulation device according to claim 1, wherein each of the rotary members is rotatable each in a reverse direction, and the spirally extended blade-shaped or the rod-shaped member provided with each of the rotary members is adapted to extend each in a reverse direction.

4. The product accumulation device according to claim 1, wherein the product supply means is arranged as that a direction where the product is supplied from the product supply means crosses at an acute angle relative to the product contact surface of the rotary member.

5. The product accumulation device according to claim 1, wherein the rotary member is arranged in pairs so that the product extends over the product contact surface.

6. The product accumulation device according to claim 1, wherein the product accumulation device is provided with a retaining means that retains every predetermined number of the product accumulated by the rotary member having the guide member.

7. The product accumulation device according to claim 1, wherein the product accumulation device is provided with a retaining means that retains every predetermined number of the product accumulated by the rotary member having the guide member.

8. The product accumulation device according to claim 2, wherein the product supply means is arranged as that a direction where the product is supplied from the product supply means crosses at an acute angle relative to the product contact surface of the rotary member.

9. The product accumulation device according to claim 3, wherein the product supply means is arranged as that a direction where the product is supplied from the product supply means crosses at an acute angle relative to the product contact surface of the rotary member.

10. The product accumulation device according to claim 4, wherein the product supply means is arranged as that a direction where the product is supplied from the product supply means crosses at an acute angle relative to the product contact surface of the rotary member.

11. The product accumulation device according to claim 5, wherein the product accumulation device is provided with a retaining means that retains every predetermined number of the product accumulated by the rotary member having the guide member.

12. The product accumulation device according to claim 5, wherein the product supply means is arranged as that a direction where the product is supplied from the product supply means crosses at an acute angle relative to the product contact surface of the rotary member.

13. The product accumulation device according to claim 6, wherein the product supply means is arranged as that a direction where the product is supplied from the product supply means crosses at an acute angle relative to the product contact surface of the rotary member.

14. The product accumulation device according to claim 7, wherein the product supply means is arranged as that a direction where the product is supplied from the product supply means crosses at an acute angle relative to the product contact surface of the rotary member.

15. The product accumulation device according to claim 11, wherein the product supply means is arranged as that a direction where the product is supplied from the product supply means crosses at an acute angle relative to the product contact surface of the rotary member.

* * * * *